United States Patent [19]

Itoh et al.

[11] 4,124,536
[45] Nov. 7, 1978

[54] CATALYST FOR REDUCING NITROGEN OXIDES

[75] Inventors: Takuji Itoh, Sayama; Satoshi Sakurada, Omiya; Nobuaki Tagaya, Kawagoe, all of Japan

[73] Assignee: Toa Nenryo Kogyo Kabushiki Kaisha, Tokyo, Japan

[21] Appl. No.: 704,777

[22] Filed: Jul. 13, 1976

[30] Foreign Application Priority Data

Jul. 17, 1975 [JP] Japan .................................. 50-87571

[51] Int. Cl.$^2$ ......................... B01J 29/06; F01C 21/00
[52] U.S. Cl. ................................. 252/455 R; 423/239
[58] Field of Search ..................... 252/455 R; 423/239

[56] References Cited

U.S. PATENT DOCUMENTS 3,962,071  6/1976  Itoh et al. ......................... 252/455 R
3,993,731  11/1976  Morikawa et al. .................. 423/239

Primary Examiner—Carl Dees

[57] ABSTRACT

Nitrogen oxides are removed from gaseous mixtures comprising the same by contacting with a catalyst comprising a base metal component carried on a silica-alumina base in the presence of ammonia.

9 Claims, No Drawings

CATALYST FOR REDUCING NITROGEN OXIDES

BACKGROUND OF THE INVENTION

This invention relates to a process for reducing the concentration of nitrogen oxides contained in a gaseous mixture. In particular, this invention relates to a process wherein the concentration of nitrogen oxides is reduced by catalytic reduction.

Nitrogen oxides are, of course, generally present in significant quantities in gaseous mixtures such as flue gases. Different methods have been used in the treatment of these gas mixtures. One type of treatment involves the catalytic reduction of the nitrogen oxides. As typical processes for removing nitrogen oxides from flue gas by catalytic reduction, there can be mentioned two processes: (1) a nonselective reduction process wherein carbon monoxide, hydrogen or a lower hydrocarbon is used as the reducing agent and (2) a selective reduction process wherein ammonia is used as the reducing agent. In the latter process (selective reduction process with ammonia), a high degree of removal of nitrogen oxides can be obtained with a small amount of reducing agent. Therefore, this process has become of major interest and several variations have been proposed.

The processes for catalytic reduction of nitrogen oxides with ammonia as the reducing agent which have been proposed so far can be divided roughly into two groups; (1) processes using a catalyst wherein the active ingredient is a noble metal such as platinum, or palladium and (2) processes using a catalyst wherein the active ingredient is a compound of a base metal, particularly a non-noble transition metal, such as copper, iron, vanadium, chromium and molybdenum. The active ingredients of these catalysts are carried generally on alumina. Noble metal catalysts are defective in that they are seriously poisoned by sulfur oxides contained in the exhaust gas. On the other hand, the base metal catalysts, while they have good resistance to poisoning by the sulfur oxides, are less active in the catalytic reduction of nitrogen oxides. Therefore, elevation of reaction temperature and reduction of space velocity are required. Exhaust gas to be treated is large in amount and temperature of the exhaust gas is low in general. Therefore, development of a highly active catalyst which can be used under reaction conditions of a low temperature and a high space velocity is desired.

SUMMARY OF THE INVENTION

In accordance with this invention, gaseous mixtures such as flue gases are treated in order to reduce the nitrogen oxides content thereof by contacting with a catalyst comprising a base metal, particularly a non-noble transition metal, component carried on a carrier comprising silica-alumina and in the presence of ammonia.

The process of the present invention is especially suitable for removing nitrogen oxides from a gas containing nitrogen oxides, sulfur compounds and oxygen.

DETAILED DESCRIPTION OF THE INVENTION

The present invention relates to a novel catalyst for reducing nitrogen oxides, and particularly to a catalyst for reducing nitrogen oxides contained in exhaust gases and to a method of removing nitrogen oxides using said reduction catalyst. More specifically, the present invention is concerned with a reduction catalyst for removing nitrogen oxides from exhaust gases containing nitrogen oxides, sulfur oxides and oxygen by way of a reducing gas, and with a method of catalytically reducing nitrogen oxides using said catalyst.

Exhaust gases from nitric acid manufacturing plants, power station boilers, sintering furnaces and high-temperature combustion devices used in various combustion furnaces, contain nitrogen oxides that are a cause of air pollution. It has been required to develop a method for efficiently removing nitrogen oxides from exhaust gases and various methods have been proposed.

For example, methods for the removal of nitrogen oxides from exhaust gases by way of a catalytic reduction can be divided into two classes: (1) a non-selective reduction method using carbon monoxide, hydrogen or a lower hydrocarbon as a reducing agent, and (2) a selective reduction method using ammonia as a reducing agent. The catalysts can be divided into two groups, that is, noble metal such as platinum and palladium, and base metals such as copper, iron, vanadium, chromium and molybdenum. Alumina and silica gel are mainly used as a carrier.

Such catalysts, however, are sulfated by sulfur oxides that are present together with nitrogen oxides in the exhaust gases, and cannot withstand long periods of use. Furthermore, in the conventional methods of removing nitrogen oxides from exhaust gases, technical problems such as pressure loss in the reaction tower and contacting problems have been considered, but attention was not sufficiently given to (1) pore volume in relation to diffusion velocity control, and (2) the determination of adsorption rate of $NH_2$ during the step in which $NH_3$ is adsorbed as $NH_2$ on the catalyst, in case of using ammonia as a reducing agent.

The inventors of the present invention have conducted extensive research in connection with the aforementioned problems in an attempt to provide a method reducing nitrogen oxides in the presence of sulfur oxides, and, in finding that (1) the silica-alumina is degraded less by the sulfation, (2) activity in the diffusion velocity control system is improved by an increase in the pore volume of the catalyst, and (3) the ammonia adsorption is improved as is the activity by increasing the solid acid of a catalyst, thus attained the present invention.

The present invention relates to a catalyst for reducing nitrogen oxides contained in exhaust gases, characterized in that said catalyst comprising metal components having reducing activity of one or more nitrogen oxides, said metal components being carried on a silica-alumina or silica-alumina-containing carrier which contains 5 to 50% by weight of silica, wherein:

(1) a specific surface area of said reduction catalyst is more than 300 $m^2$ per gram;

(2) the volume of pores having diameters ranging from 0 to 600 angstroms is less than about 80% of the total pore volume;

(3) the volume of pores having a diameter ranging from 150 to 600 angstroms is more than about 30% of the volume of pores having a diameter ranging from 0 to 600 angstroms; and (4) the bulk density is less than about 0.5 grams per milliliter.

The alumina carrier having silica according to the present invention contains silica in a quantity ranging from 5 to 50% by weight, preferably from 10 to 25% by weight, and satisfies the following values:

(1) Specific surface area is more than about 300 m$^2$ per gram. A high specific area is required to increase the site of activity and to carry the active metal components over wide ranges. The preferred specific area ranges from 300 to 500 m$^2$ per gram.

(2) The volume of pores having a diameter ranging from 0 to 600 angstroms should be less than about 80% of the total volume of pores. This value results from the fact that the reaction in which nitrogen oxides in the exhaust gases are catalytically reduced is greatly enhanced by the pore distribution ranging from macropores having a diameter of more than 600 angstroms to micropores having a diameter of less than 600 angstroms; this value was determined by taking into consideration the reaction in the system for controlling diffusion velocity. The preferred range of pores having a diameter ranging from 0 to 600 angstroms should be 40% to 80%, and more preferably more than about 50% with respect to the total volume of pores in order to retain catalyst strength.

(3) The volume of pores having a diameter ranging from 150 to 600 angstroms should be more than about 30% of the volume of pores of a diameter of 0 to 600 angstroms.

This value was also determined for the purpose of enhancing the diffusion velocity control as mentioned above, in which micropores are not concentrated in particular sizes but are distributed widely. The volume of pores having a diameter of 150–600 angstroms should preferably range from 30–60% of the volume of pores having a diameter of 0–600 angstroms.

(4) The bulk density should be less than about 0.50 gram per milliliter.

This value was determined to meet the requirements of (2) and (3) above; the purpose is attained by confining the bulk density to less than about 0.5 gram per milliliter.

The catalyst to be employed in the present invention is manufactured by a method in which a silica gel and alumina gel prepared respectively beforehand are mixed together, or by a method in which an acid or alkali is added to a homogeneous mixture solution of a water-soluble aluminum compound and a water-soluble silicon compound, so as to coprecipitate the two components. To attain the object of the present invention, it is required to adjust the preparation conditions such as temperatures and time during the precipitation and aging of the hydrates of silica and alumina so that a catalyst meeting the aforementioned values will be obtained; it is also necessary to add additives during aging.

A preferred method consists of bringing ammonium carbonate into existence in a suspension of a colloidal sol or colloidal gel of silica and alumina in an amount of 0.001 to 5 mole, preferably 0.1 to 3 mole with respect to 0.1 to 4 mole of the alumina-soluble salt, thereby aging said sol or gel at a pH value ranging from 6 to 11, preferably from 8 to 10. After the aging, the precipitate is separated by filtration and molded after being washed by a conventional manner. The colloidal sol or colloidal gel of silica and alumina can be prepared by adding an acid, such as hydrochloric acid or sulfuric acid, or a base, such as ammonia, water, or alkali hydroxide, to an aqueous solution of a silicon compound or of an aluminum compound or to a mixture solution thereof, and adjusting the pH value within 6 to 11. The aging is performed directly by adding an ammonium carbonate to the so obtained suspension, or by treating the colloidal gel by filtration or centrifugal separation to remove impurity salts and suspending the precipitate in the solution of ammonium carbonate. Either one of the above two aging methods may be employed, but the former method is preferred in view of its operation.

It is supposed that the coagulated state of suspended substances in the colloidal sol or gel of silica and alumina is controlled by the presence of ammonium carbonate at the time of aging, and it is possible to obtain a silica-alumina having particular physical properties.

Examples of silica sources for the preparation of a silica-alumina carrier may be silicon compounds such as alkali metals silicates (Na$_2$O:SiO$_2$ = 1:2 to 1:4), tetraalkoxysilane, and orthosilicic ester. Also, the source of alumina may be inorganic or organic aluminum compounds such as sulfates, hydrochlorites, nitrates, alkali metal aluminates and aluminum alkoxides.

The preparation of silica-alumina carriers will now be described.

An alkali hydroxide or alkali aluminate is added to an aqueous solution of acidic aluminum compound, to which is further added an aqueous solution of an alkali silicate containing an acidic substance. The pH of the resulting mixture is adjusted to 6 to 11, preferably 8 to 10 at room temperature, to prepare a hydrogel or hydrosol. To the resulting suspension is added a dilute ammonium carbonate solution thereby maintaining the aforesaid pH value, and the resulting mixture is heated to a temperature of 50° to 98° C. and kept at its temperature for at least 2 hours. After the aforesaid treatment has finished, the precipitate is separated by filtration, washed with ammonium acetate and water to remove ionic impurities, dried and calcined. The drying is effected at a temperature ranging from room temperature up to 200° C. in the presence or absence of oxygen, and the calcination is effected in the presence of oxygen at a temperature ranging 200° to 800° C.

According to the present invention, the carrier may contain, in addition to silica-alumina, one or more refractory materials such as magnesia, thoria, titania, hafnia or boria in an amount of 1 to 30% by weight, preferably 1 to 10% by weight, which can be preferably prepared by coprecipitating the refractory materials together with silica and alumina.

Active metal components for reducing nitrogen oxides may be copper, zinc, cadmium, chromium, molybdenum, tungsten, vanadium, manganese, iron, cobalt and nickel, used alone or in combination of two or more kinds. There can also be used noble metals of the Group Ib and Group VIII of the Periodic Table, such as silver, gold, platinum, palladium, and iridium. Preferred active metal components may be copper, chromium, vanadium and iron, used alone or in combination of two or more kinds. The most preferable active metal component is copper. These active metal components are carried in the form of metal and/or oxides in catalytically effective amounts on the carrier. Preferred amounts on the carrier is in the range of 1 to 5% by weight.

The active metal components can be carried in the carrier by: the method (impregnation method) in which the carrier is impregnated in the solution of a soluble salt to introduce metal components into the carrier; the method (coprecipitation method) in which the silica-alumina hydrate which is a carrier and the active metal components are coprecipitated; and by the method (kneading method) in which a carrier powder and active metal components are mixed together. A preferred method of carrying metal components may be an impregnation method in which the metal components are carried in catalytically effective amounts without spoiling the properties of the carrier. Any of the conventional method may be employed for the impregnation. That is, the carrier is calcined and immersed in a solution containing active metal compounds, followed by calcination to convert the impregnated salts into the corresponding oxides. In case the active metal component is copper, there may be used copper nitrate, copper chloride, copper acetate and other soluble inorganic or organic compounds. Other active metal component such as vanadium iron or chromium may also be used by selecting an appropriate soluble compounds for the impregnation.

Further, as for the impregnation medium, there may be employed water or organic solvents such as alcohols, ketones, etc. The impregnation treatment is effected by impregnating the carrier in the impregnation solution containing active metal compounds at room temperature or at a temperature higher than room temperature, under conditions in which the desired metal components are sufficiently impregnated into the carrier. The amount of impregnation solution and the concentration of metal components are appropriately adjusted so that the metals are carried in desired amounts. To carry two or more active metal components, there can be employed either the one-liquid impregnation method or the two-liquid impregnation method. That is, the one-liquid impregnation method is effected by using a mixture solution containing two or more metal components, and the two-liquid impregnation method is effected by separately preparing the solutions of two or more metal components and immersing the carrier successively.

After the impregnation of the active metal components, the catalyst is dried, and then calcined in the presence of oxygen at a temperature ranging from 350° to 700° C., preferably 400° to 600° C.

The shape of catalyst is not particularly restricted. But to have the catalyst contacted with large amounts of gases, it is preferred that the catalyst be made in the form of cylinders, spheres, or Raschig rings that have large areas to contact with the gases and that allow gases to flow easily.

Now, the reduction method of nitrogen oxides using a catalyst of the present invention is now described. The ammonia is added to exhaust gases containing nitrogen oxides and oxygen, and the gaseous mixture of said exhaust gases and ammonia is contacted with said reduction catalyst under the reducing reaction conditions, to selectively reduce the nitrogen oxides.

Exhaust gases are exhausted from power station boilers, chemical plant boilers and other stationary sources. The gases contain nitrogen oxides, sulfur oxides and oxygen, in addition to carbon dioxide, water vapor and nitrogen. Typical composition of flue gas is as follows:

| | |
|---|---|
| Nitrogen oxides (NO$_x$) [x generally 1 or 2] | 0.001 to 0.05% |
| Sulfur oxides (SO$_{x'}$) x' : 2 or 3 | 0.01 to 0.3% |
| Oxygen (O$_2$) | 3 to 10% |

As reducing agents for nitrogen oxides, there may be employed ammonia or other ammonia-producing substances, which produce ammonia under the reaction conditions, such as easily decomposable ammonium compounds.

The amount of ammonia to be added to the exhaust gases should be more than about 0.7 times of the stoichiochemical amount that is required for reducing nitrogen oxides into completely harmless nitrogen. Where most of the nitrogen oxides is a nitrogen monoxide (NO), the ammonia should be added in an amount of more than about 0.5 mole per mole of the nitrogen monoxide. The particularly preferred amount of ammonia ranges from the stoichiometrical amount to about 1.5 mole per mole of the nitrogen monoxide.

The reducing reaction of nitrogen oxides with ammonia is represented by the following formula, in which harmful nitrogen oxides in the exhaust gases are converted into harmless nitrogen.

$$6 NO + 4 NH_3 \rightarrow 5 N_2 + 6 H_2O$$

$$6 NO_2 + 8 NH_3 \rightarrow 7 N_2 + 12 H_2O$$

The gaseous mixture of exhaust gases and ammonia is contacted with a fixed-bed catalyst at a temperature between 200° to 500° C., preferably at a temperature ranging from 300° to 400° C., and at a gas-space velocity ranging from 2,000 to 100,000 V/H/V, and preferably ranging from 5,000 to 30,000 V/H/V.

The reduction catalyst for nitrogen oxides according to the present invention exhibits the following remarkable properties: (1) it is less subject to the sulfation with sulfur oxides in the exhaust gases, (2) it exhibits high activity in the diffusion velocity control system owing to its large pore volume, and (3) it adsorbs ammonia in large amounts, and exhibits high activity. Therefore, the catalyst of the present invention is not degraded even when used for extended periods of time in removing nitrogen oxides from the exhaust gases containing large amounts of sulfur oxides, and is capable of selectively reducing nitrogen oxides without being affected by oxygen in the exhaust gases. The catalyst is valuable in an industrial sense.

The invention is illustrated below in detail with reference to the Examples and Comparative Examples.

COMPARATIVE EXAMPLE 1

A V$_2$O$_5$/γ-alumina catalyst was prepared by having ordinary γ-type alumina (refer to Table I for physical properties) impregnated with aqueous solution of ammonium metavanadate, followed by drying and calcining, so that the catalyst carries 2.77% by weight of valadium pentoxide.

Also, a synthetic flue gas of the composition shown below was prepared to conduct a reaction at a reaction temperature of 450° C. and at a space velocity of 3,000 V/H/V, to subject the carrier to the sulfation reaction.

| Gas composition: | | | |
|---|---|---|---|
| SO$_2$ | 70ppm | 500ppm | 5000ppm |
| H$_2$O | 10% | 10% | 10% |
| Air | Balance | Balance | Balance |

In the above reaction, SO$_2$ turns into SO$_3$ in the presence of V$_2$O$_5$ as represented by SO$_2$ + ½ O$_2$ → SO$_3$. The SO$_2$ reacts with alumina which is a carrier to form aluminum sulfate (Al$_2$(SO$_4$)$_3$). The so formed aluminum sulfate which has a very small surface area and pore volume, decreases the function of the carrier. In ordinary reactions for reducing NOx in which SOx is contained, the prevention of the carrier sulfation is an important requirement for the development of high-activity and long-life catalysts. Furthermore, $V_2O_5$ is one of the effective catalysts among the catalyst metals and is comparable to platinum with regard to its ability to convert $SO_2$ into $SO_3$.

The $V_2O_5$ makes an excellent catalyst in the acceleration tests. It has been confirmed by different experiments that iron, cobalt and copper, which are employed in the present invention, also invite similar sulfation reaction.

The results of the reaction were as follows:

| $SO_2$ partial pressure ppm | Rate of alumina carrier sulfated (% by weight) |
| --- | --- |
| 70 | 4.5 |
| 50 | 9.0 |
| 500 | 21.0 |

The above results indicate that the γ-alumina is subject to invite the sulfation reaction, and largely depends upon the partial pressure of $SO_2$.

EXAMPLE 1

The experiments were conducted for the silica-alumina carrier having physical properties shown in Table I under quite the same conditions as in Comparative Example 1. In this Example, 4.73% by weight of $V_2O_5$ was carried. It has been confirmed by different experiments that the amount of $V_2O_5$ carried is linearly related to the sulfation yield.

The results of the reaction were as follows:

| $SO_2$ partial pressure | Rate of Silica-alumina carrier sulfated (% by weight) |
| --- | --- |
| 70 | 0 |
| 500 | 0 |
| 5000 | 0.37 |

In this way, it is understood from the above Example that the aforesaid silica-alumina is very stable against the $SO_3$.

TABLE I

|  | γ-alumina Comparative Example | Silica-alumina (Example) |
| --- | --- | --- |
| Silica content (% by weight) | — | 24.5 |
| Surface area (m²/g) | 137 | 334 |
| Pore volume (0/600 angstroms (diameter)) | 0.46 | 0.83 |
| Bulk density (g/ml) | 0.72 | 0.37 |

EXAMPLES 2 AND 3

Silica-alumina A (silica content, 11.6% by weight) and silica-alumina B (silica content, 24.5% by weight) prepared under different preparation conditions were treated in the following manner to obtain two catalysts carrying a copper oxide.

(1) One hundred grams of a powder of silica-alumina A (dried at 120° C.) was admixed with 280 ml. of a 2% aqueous acetic acid and 20 g. of a crystalline cellulose. The resultant mixture was kneaded together to a moldable water content, and molded to the shape of a cylinder having a diameter of 3 mm using an extruder. The so obtained cylinder was dried using a hot air drier heated at 110° C. and then calcined at 700° C. for 3 hours to prepare a carrier. One hundred grams of the so obtained carrier was immersed in a 9.5% aqueous copper nitrate solution, taken out from the solution, dried, and calcined at 500° C. for 16 hours in an air stream. A catalyst was obtained having properties shown in Table II and carrying 3% by weight of a copper oxide as copper.

A gaseous mixture of the following compositions to which was further added 250 ppm of ammonia was passed through the reactor in which was packed 10 ml of the aforesaid catalyst at a space velocity of 20,000 V/H/V, and the results were obtained as shown in Table III.

NO: 250 ppm, $CO_2$: 10%, $O_2$: 3%, $SO_2$: 300 ppm, water vapor: 10%, $N_2$: balance.

(2) To 80 g. of a silica-alumina B (silica content, 24.5% by weight) powder (dried at 120° C.) was added 260 ml. of water. The mixture was kneaded for about 1 hour to a moldable water content, and molded to the shape of a cylinder having a diameter of 3 mm using an extruder. The cylinder was then dried using a hot air dryer heated at 110° C., and then calcined at 700° C. for 3 hours to make a carrier. The carrier was immersed in an aqueous solution of copper nitrate to obtain a catalyst having properties shown in Table II.

The so-obtained catalyst was evaluated for its activity in the same manner as above, and the results were obtained as shown in Table III.

COMPARATIVE EXAMPLE 2

The same operation as in Example 2 was effected with the exception of carrying 1.5% by weight of a copper oxide as copper silica-alumina C (silica content, 11.6% by weight), to obtain a catalyst having properties shown in Table 2. The so obtained catalyst was evaluated for its activity in the same manner as in Examples 2 and 3, to find the rate of reducing nitrogen oxides (NO). The results were obtained as shown in Table III.

COMPARATIVE EXAMPLE 3

To 100 g. of silica-alumina (silica content, 11.6% by weight) powder, 2% by weight of an acetic acid solution was added and kneaded to a moldable water content. The mixture was then molded to the shape of a cylinder having a diameter of 3 mm using an extruder. The so obtained cylinder was dried using a hot air dryer heated at 110° C., and then calcined at 500° C. for 3 hours to make a carrier. One hundred grams of the resulting carrier was immersed in 12% aqueous copper nitrate solution, dried and then calcined to obtain a catalyst.

TABLE II

|  | Specific area (BET, m²/g) | Bulk density (g/ml) | Pore volume diameter 600A or less | (ml/g) in diameter 600A or more | Pore distribution (%) (0-600A/0-150,000A) × 100 | (150-600A/0-600A × 100 | Silica content (% by weight) |
| --- | --- | --- | --- | --- | --- | --- | --- |
| Example 2 | 337 | 0.25 | 0.771 | 0.57 | 57 | 38 | 11.6 |
| Example 3 | 325 | 0.23 | 0.793 | 0.88 | 47.5 | 51 | 24.5 |
| Comparative Example 2 | 314 | 0.73 | 0.413 | 0.03 | 93.5 | 8 | 11.6 |
| Comparative Example 3 | 352 | 0.48 | 0.721 | 0.09 | 89 | 29 | 11.6 |

TABLE III

|  | NO Conversion % | | | |
|---|---|---|---|---|
|  | 300° C. | 350° C. | 400° C. | 450° C. |
| Example 2 | 75 | 97 | 99 | 96 |
| Example 3 | 71 | 88 | 93 | 92 |
| Comparative Example 2 | 56 | 76 | 85 | 84 |
| Comparative Example 3 | 65 | 78 | 84 | 80 |

COMPARATIVE EXAMPLE 4

The carrier composed of γ-alumina only was tested for its activity under exactly the same conditions as in Examples 2 and 3.

The activity results are shown in Table IV, and the physical properties are shown in Table V.

TABLE IV

|  | NO Conversion (%) | | | | |
|---|---|---|---|---|---|
|  | 250° C. | 300° C. | 350° C. | 400° C. | 450° C. |
| CuO/γ-alumina | 14 | 35 | 56 | 61 | 57tz,1/32 |

Gas Hourly Space Velocity 20,000 V/H/V

TABLE V

|  | Surface area ($m^2/g$) | Bulk density (g/ml) | Pore volume | |
|---|---|---|---|---|
|  |  |  | 600 A or more | 600/150,000A |
| CuO/γ-alumina | 137 | 0.72 | 0.46 | 0.10 |

Pore distribution (%)
(diameter 0-600A/diameter 0-150,000A)×100

EXAMPLES 4, 5, 6 AND 7

The carrier obtained in Example 1 was so immersed in an aqueous solution of iron nitrate as to carry 3% of iron, dried at 110° C., and then calcined at 500° C. for 3 hours to obtain a catalyst E ($Fe_2O_3/SiO_2.Al_2O_3$).

The same carrier was then impregnated with vanadium using an aqueous solution of ammonium metavanadate so that the carrier will carry 3% of vanadium, dried in the same manner as above, and calcined to obtain a catalyst F ($V_2O_5/SiO_2.Al_2O_3$).

Using these catalysts E and F, and a synthetic flue gas of the composition of Table VI, the reaction was carried out under the reaction conditions shown in Table VI. The results were as shown in Table VII.

TABLE VI

| NO | 250 ppm |
|---|---|
| $NH_3$ | 250 ppm (1.5 times of a stoichiometric amount of $6NO + 4NH_3 \rightarrow 5N_2 + 6H_2O$) |
| $SO_2$ | 300 ppm |
| $CO_2$ | 10% |
| $O_2$ | 3% |
| $H_2O$ | 10% |
| $N_2$ | Balance |
| Amount of Catalyst | 10 ml |
| Space Velocity | 20,000 V/H/V |

TABLE VII

| Reaction Temperature | NO Conversion (%) | | | | |
|---|---|---|---|---|---|
|  | 250° C. | 300° C. | 350° C. | 400° C. | 450° C. |
| $CuO/SiO_2 \cdot Al_2O_3$ (Example 2) | 49 | 75 | 97 | 99 | 96 |
| Catalyst E (Example 4) ($Fe_2O_3/SiO_2 \cdot Al_2O_3$) | 27 | 48 | 67 | 88 | 85 |
| Catalyst F (Example 5) ($V_2O_5/SiO_2 \cdot Al_2O_5$) | 52 | 67 | 75 | 88 | 75 |

The above results prove that the catalyst $CuO/SiO_2.Al_2O_3$ exhibits remarkable effects except in low temperature range of less than 300° C.

From the foregoing Examples and Comparative Examples, it is apparent that a catalyst having properties covered in the present invention exhibits a high activity as a reduction catalyst over a wide range of temperatures.

What is claimed is:

1. A catalyst for reducing nitrogen oxides contained in exhaust gases, comprising at least one metal component having activity to reduce nitrogen oxides, said metal components being carried on a silica-alumina or a silica-alumina-containing carrier which contains 5 to 50% by weight of silica and which possesses the following properties:
   (1) a specific surface area of more than about 300 $m^2/g$;
   (2) a volume of pores having a diameter ranging from 0 to 600 Angstroms less than about 80% of the total volume of pores:
   (3) a volume of pores having a diameter ranging from 150 to 600 Angstroms more than about 30% of the volume of pores having a diameter ranging from 0 to 600 Angstroms; and
   (4) a bulk density less than about 0.5 grams per milliliter.

2. The catalyst of claim 1 wherein said carrier contains from about 10 to 25% by weight of silica.

3. The catalyst of claim 1 wherein the surface area of said reduction catalyst varies between 300 and 500 $m^2$ per gram.

4. The catalyst of claim 1 wherein the volume of pores having a diameter ranging from 0 to 600 Angstroms varies from 50 to 80% of the total volume of pores.

5. The catalyst of claim 1 wherein the volume of pores having a diameter ranging from 150 to 600 Angstroms varies from 30 to 60% of the volume of pores having a diameter ranging from 0 to 600 Angstroms.

6. A catalyst of claim 1 wherein the metal component comprises a metal, a metal oxide or mixtures thereof, said metal selected from the group consisting of copper, chromium, vanadium, iron and mixtures thereof.

7. The catalyst of claim 6 wherein said metal component comprises from 1 to 5% by weight of said catalyst.

8. A catalyst for reducing nitrogen oxides contained in exhaust gases, comprising a metal, metal oxide or mixtures thereof, said metal selected from the group consisting of copper, chromium, vanadium, iron and mixtures thereof, said metals and/or metal oxides being carried on a silica-alumina or a silica-alumina-containing carrier which contains 10 to 25% by wt. of silica and which possesses the following properties:
   (1) a specific surface area varying between about 300 to 500 $m^2/gm$;
   (2) the volume of pores of said carrier having a diameter ranging from 0 to 600 Angstroms varies between 50 and 80% of the total volume of pores;
   (3) the volume of pores of said carrier having a diameter ranging from 150 to 600 Angstroms varies from 30 to 60% of the volume of pores having a diameter ranging from 0 to 600 Angstroms; and
   (4) a bulk density less than about 0.5 gram per milliliter.

9. The catalyst of claim 8 wherein said catalyst contains copper oxide.

* * * * *